United States Patent [19]

Ringwood

[11] Patent Number: 4,948,388

[45] Date of Patent: Aug. 14, 1990

[54] DIAMOND COMPACTS AND PROCESS FOR MAKING SAME

[75] Inventor: Alfred E. Ringwood, Redhill, Australia

[73] Assignee: The Australian National University, Australia

[21] Appl. No.: 250,259

[22] Filed: Sep. 27, 1988

Related U.S. Application Data

[63] Continuation of Ser. No. 882,937, Jun. 19, 1986, Pat. No. 4,874,398.

[30] Foreign Application Priority Data

Aug. 24, 1984 [AU] Australia .................. PG6772/84
Aug. 23, 1985 [WO] PCT Int'l Appl. .......... AU85/00201

[51] Int. Cl.$^5$ .................................... B24D 3/02
[52] U.S. Cl. ............................ 51/308; 51/309
[58] Field of Search ........................ 51/308, 309

[56] References Cited

U.S. PATENT DOCUMENTS

| | | | |
|---|---|---|---|
| 3,574,580 | 4/1971 | Stromberg et al. | 51/307 |
| 4,124,401 | 11/1978 | Lee et al. | 501/90 |
| 4,142,869 | 3/1979 | Vereschagin et al. | 51/295 |
| 4,151,686 | 3/1979 | Lee et al. | 51/295 |
| 4,167,399 | 9/1979 | Lee et al. | 51/307 |
| 4,168,957 | 9/1979 | Lee et al. | 51/309 |
| 4,231,195 | 11/1980 | DeVries et al. | 51/308 |
| 4,241,135 | 12/1980 | Lee et al. | 51/308 |
| 4,259,090 | 3/1981 | Bovenkerk | 51/309 |

*Primary Examiner*—Paul Lieberman
*Assistant Examiner*—Willie J. Thompson
*Attorney, Agent, or Firm*—Nixon & Vanderhye

[57] ABSTRACT

A diamond compact comprised of 60-95 volume percent of diamond crystals which have been plastically deformed so that they form a rigid framework structure in which contacts between the diamond crystals occur over surfaces arising from plastic deformation of the diamond crystals during formation of the compact under pressure and temperature conditions within the graphite stability field. The diamond framework structure is bonded together by interstitial refractory carbide phases or metallic phases comprised of metals not forming carbides in the presence of carbon. The phases have a melting point greater than 1600° C. The compact comprises less than about 2 percent volume of graphite and possesses a compressive strength greater than 10 kbars.

1 Claim, 3 Drawing Sheets

DIAMOND COMPACTS AND PROCESS FOR MAKING SAME

This is a continuation of application Ser. No. 06/882,937, filed June 19, 1986 now U.S. Pat. No. 4,874,398.

This invention relates to an improved method of producing a diamond compact possessing sufficiently high degrees of abrasiveness, hardness and mechanical strength so as to permit the compact to be employed usefully in the cutting, turning and drilling of hard materials such as rocks, ceramics and carbides.

Many different kinds of diamond compacts and diamond composites have been described in the literature and their properties vary widely. Generally speaking, a diamond compact is understood to mean a polycrystalline body possessing substantial abrasiveness and hardness and low or negligible porosity, comprised of more than 50 percent by volume of diamond crystals, in which a large proportion of diamond-to-diamond contacts occur.

In one class of diamond compacts, which usually contain more than 80 percent by volume of diamond crystals, the diamonds are joined at their contacts by diamond-to-diamond bonding. This means that the diamond crystalline structure is essentially continuous between adjacent diamond crystals and the strengths of the bonds between adjacent crystals are comparable with the strength of the carbon to carbon bonds within single diamond crystals.

A second class of diamond compacts exists which are composed of more than 50 percent by volume of diamond and less than 50 percent by volume of non-diamond bonding materials, wherein the diamonds themselves are only weakly bonded at their mutual contacts and the cohesion of the compact is provided mainly by bonding between the diamonds and the non-diamond bonding material. The difference between these two classes is readily revealed when the compact is leached with a solvent which selectively dissolves the non-diamond bond. If true diamond-to-diamond bonding exists, the diamond crystals remain strongly bonded. However, if this kind of bonding is not present, the individual diamonds can readily be separated, after dissolution of the compact, using, for example, a steel needle or scalpel.

It will be appreciated by those skilled in the art that the qualities displayed by diamond compacts proposed in the literature vary over an extremely broad range, according to their composition, structures, nature of their bonds and their pressures, temperatures and times of formation. Many compacts, particularly those produced at pressures below 40 kbars, may display high hardness and abrasiveness, but are lacking in toughness and compressive strength. These can be useful for grinding and general abrasive purposes, but cannot be practically utilized in applications where a combination of high hardness with high toughness and compressive strength is required, for example, in drilling, turning and machining hard rocks, hard ceramics and carbides. Diamond compacts in this category should possess compressive strengths of at least 10 kbars and preferably greater than 20 kbars.

Diamond compacts suitable for use as drilling bits, cutting tools, wire-drawing dies, nozzles and related applications can be made by several techniques. One such technique (U.S. Pat. Nos. 3,745,623; 3,609,818) places a mass of polycrystalline diamond in juxtaposition with an appropriate metallic catalyst or metallic carbide substrate and subjects the entire body to high pressures and temperatures in the thermodynamic stability field of diamond (e.g. 60 kbars, 1500° C.). A related process described by H. Katzman and W. Libby (Science 172, 1132, 1971) mixes a minor proportion of an appropriate metallic catalyst with a major proportion of diamond crystals and subjects the entire mixture to high pressures and temperatures in the diamond thermodynamic stability field at temperatures above the melting point of the respective diamond-catalyst eutectic temperature. These processes are capable of producing mechanically strong and hard compacts containing extensive diamond-to-diamond bonding between adjacent crystals. These processes possess certain disadvantages, however. They require highly specialised and expensive apparatus in order to produce the very high pressures and temperatures. Moreover, the sizes and/or thicknesses of the bonded diamond compacts are relatively small. Finally, the compacts contain significant amounts of bonding metals (e.g. cobalt, nickel) as inclusions. If the compacts are subjected to high temperatures (e.g. >800° C.) as can be produced during drilling of hard rocks or machining hard ceramics, the metallic inclusions can catalyze the retrogressive transformation of diamond to graphite, accompanied by decreases in strength and hardness.

Alternative processes for producing large compacts of polycrystalline diamond at relatively low pressures are described in U.S. Pat. Nos. 4,124,401, 4,167,399 and in European Patent Application No. 56,945, although these compacts are not suitable for drilling, turning and machining hard rocks. In these processes, aggregates of appropriately conditioned diamond crystals (typically 5–500 microns diameter) are precompacted in a die at modest pressures (e.g. 7 kbars) and at ambient temperature to form weak porous bodies of desired shape. These bodies are then placed in proximity to a mass of silicon or silicon-based alloy. The entire assembly is then heated to a temperature sufficient to melt the silicon or silicon-alloy (e.g. 1450°–1500° C.), either without application of pressure or with the application of a modest pressure (<7.5 kbars). The silicon or silicon-alloy melts and infiltrates the porous diamond body and reacts with some diamond or introduced carbon to form a bond composed largely of silicon carbide. This bond surrounds individual diamond crystals and bonds them to form a dense, hard compact. These processes are performed in the thermodynamic stability field of graphite; hence the temperature-time conditions during reaction with molten silicon must be carefully controlled so as to minimise transformation of diamond to graphite. Since the loosely-compacted diamonds are almost completely immersed in and surrounded by a relatively large volume of bonding material, typically a mixture of silicon carbide and silicon, required to fill the interstices, the mechanical properties of the compact are largely determined by the strength of the silicon carbide and silicon bonding material. The bonding formed at these low pressures is much weaker than the diamond-to-diamond bonds formed in the first set of processes described above, hence the products are correspondingly weaker than the compacts formed in the diamond stability field.

A compromise between these two classes of processes for preparing diamond compacts is described in British Patent No. 1,382,080. The process is operated in the graphite thermodynamic stability field at pressures between 10 and 50 kbar. This method can utilize simpler apparatus possessing much larger working volumes than the apparatus used to produce compacts in the diamond stability field. According to this process, a mass of diamond powder is placed adjacent to a mass of relatively low melting temperature metallic bonding agent such as nickel, cobalt, iron and manganese and alloys of these metals and of chromium, zirconium and titanium with copper. The assembly is placed in a high pressure-high temperature apparatus and subjected to a pressure of 10 to 50 kbars or higher at a temperature sufficient to melt the bonding agent. The liquid metal is rapidly injected into the interstices between the diamond crystals, forming a metallic bond. Since the metals and metal alloys used also catalyze the transformation of diamond to graphite when liquid, the reaction times must be very short, typically 30 seconds to 1.5 minutes at temperatures of 1150°–1500° C., in order to minimise the formation of graphite.

In the process of GB No. 1,382,080, the application of high pressure has two main functions. Firstly, it increases the rate of impregnation of the porous diamond mass by molten metal or alloy. Because the compact product is produced very rapidly, graphitization of the diamonds is minimised. Secondly, it pre-compacts the mass of diamond crystals, producing a large number of diamond-to-diamond point and edge contacts. This improves the compressive strength and rigidity of the resultant compact. The metallic bonding agent fills the interstices, binding the diamonds, thereby providing the tensile strength of the compact. However, because the metallic bonding agents used in the above process begin to melt at temperatures of 900°–1320° C., and become relatively soft at temperatures well below 900° C., compacts made according to this process cannot advantageously be employed in situations where they may be subjected to high temperatures, e.g. in the drilling of hard rock and machining of hard ceramics. Moreover, because of the short time employed in producing the compacts by this process, chemical equilibrium between the bonding agent and the diamond is difficult to achieve. Accordingly, the stability and strength of the bond between the diamonds can be affected adversely if the compacts are employed in situations where they are subjected to high temperatures, as outlined above. Finally, the catalytic activity of the proposed metallic binding agents in the retrogressive transformation of diamond to graphite at elevated temperatures, which may even arise in some of the binding agents in their solid phase, provides a further restriction on the use of such compacts at elevated temperatures.

A process which removes some of these difficulties is disclosed in U.S. Pat. No. 3,913,280. This process also proposes uses of pressure-temperature conditions in the graphite stability field and produces a compact composed of a mixture of a major proportion of diamond crystals and a minor proportion of materials defined as sintering aids which promote diamond-to-diamond bonding between diamond crystals. The sintering aids proposed for use in U.S. Pat. No. 3,913,280 comprise a selection of highly refractory substances such as carbides, borides, nitrides, oxides and silicates, as well as elements which produce such substances, which occupy the voids between the bonded diamond particles. These sintering aids tend to be advantageous with respect to thermal stability as compared with those used in GB No. 1,382,080 above. However, in order to produce a practically useful diamond compact, possessing a high compressive strength (e.g. 10 kbars), the disclosed exemplary practice of this process utilizes high pressures of at least 55 kbars and in all but one example of 65 kbars, combined with high temperatures, in the vicinity of 2000° C. and close to the diamond stability field. These conditions require the utilization of specialised and expensive high pressure equipment, similar to that which is used in the commercial synthesis of diamonds. Moreover the reaction times used to produce diamond compacts as practised in the proposed process are very short, typically less than 1 minute. With these short reaction times, chemical equilibrium between sintering aids and diamond may not be achieved, with resultant loss in mechanical strength at high temperatures. Short reaction times are essential under the conditions employed in U.S. Pat. No. 3,913,280, if excessive formation of graphite by retrogressive transformation from diamond, accompanied by degradation of mechanical properties of the compact, is to be avoided.

A related process is disclosed in U.S. Pat. Nos. 4,231,195 and 4,151,686. This process produces a diamond compact bonded substantially by silicon carbide. The compact is formed by placing a mass of diamond crystals adjacent to a bonding agent comprised of silicon or silicon alloy, subjecting the entire assembly to high pressure and then melting the bonding agent so that the liquid silicon or silicon alloy infiltrates the diamond mass, thereby bonding the diamonds to form a mechanically strong and abrasive body. The pressure-temperature conditions preferred in the practice of this invention are close to the diamond-graphite equilibrium line and may lie either in the diamond or graphite stability fields. In the practical demonstration of this process, pressure of 55 kbars at temperatures of 1160°–1475° C. were used. The preferred range of pressures was 45–55 kbars. In order to achieve these conditions, it is necessary to employ specialised and expensive apparatus, similar to that which is used in the commercial synthesis of diamonds.

It is an object of the present invention to alleviate the disadvantages of all of the aforementioned processes for producing a diamond compact by operating in a pressure range which permits relatively simple apparatus to be used and yet may form a thermally stable diamond compact possessing considerable hardness and abrasiveness combined with a compressive strength of at least 10 kbars.

The following features are relevant to the invention:

Subjecting a mixture of powdered diamond and bonding agent to a combination of pressures, temperatures and times:

(1) at pressures above about 10 kbars and up to about 40 kbars and preferably between 15 and 30 kbars and in the temperature interval 1100°–1600° C., thereby falling in the graphite stability field;

(2) which permit plastic deformation in a substantial proportion, preferably majority of the diamond crystals in the time interval over which the compact is subjected to high pressures and temperatures. The minimum time limit is about three minutes and preferably is five minutes or more.

(3) which permit a substantial or complete degree of chemical equilibration between the bonding agent and the diamond;

(4) which produce a thermally stable bonding material between diamond crystals so that the minimum melting point of the final composite exceeds about 1600° C.;

(5) which employs a bonding agent that inhibits the retrogressive transformation of diamond to graphite. By "inhibits" the retrogressive transformation of diamond to graphite, we mean that the graphite volume content of the final compact when formed by the process of the invention is smaller than about 2 percent and preferably smaller than 1 percent.

According to the present invention there is provided a process for producing a diamond compact which comprises:

(i) intimately mixing a mass of particulate diamond crystals with a bonding agent in the proportions 60 to 95 volume of diamond to 40 to 5 volume percent of bonding agent, the bonding agent comprising one or more of the elements selected from the groups of (a) elements, and metallic alloys containing elements, which react with carbon to form stable carbides having melting points exceeding about 1600° C. and thereby inhibit the production of free graphite by retrogressive transformation from diamond and (b) metals, and alloys containing metals, which do not form stable carbides but which produce a bond with diamond having a minimum melting temperature exceeding about 1600° C. when heated in contact with diamonds in the solid state and which inhibit the retrogressive transformation of diamond to graphite;

(ii) subjecting the mixture to a temperature in the range of 1100° to 1600° C. at a mean confining pressure above 10 kbars and up to 40 kbars, said combination of mean confining pressure and temperature lying within the graphite stability field; and (iii) maintaining the temperature and pressure conditions on the mixture for a period of at least about three minutes sufficient to cause plastic deformation of the diamond crystals whereby contacts between the diamond crystals occur over surfaces, and to cause at least substantial chemical equilibrium between the bonding agent and the diamond crystals whereby a thermally stable diamond compact having a minimal melting point of about 1600° C. and a minimum compressive strength of about 10 kbars at ambient temperature is produced.

Further according to the present invention there is provided a diamond compact when formed by the process described in the immediately preceding paragraph.

Still further according to the present invention there is provided a diamond compact comprised of 60 to 95 volume percent of diamond crystals which have been plastically deformed so that they form a rigid framework structure in which contacts between diamond crystals occur over surfaces, said surfaces arising from plastic deformation of the diamond crystals during formation of the compact under pressure and temperature conditions within the graphite stability field, said diamond framework structure being bonded substantially wholly by interstitial refractory carbide phases or metallic phases comprised of metals not forming carbides in the presence of carbon, said phrases having a melting point greater than 1600° C., said compact comprising less than about 2% volume of graphite and possessing a compressive strength greater than 10 kbars.

A major advantage of performing the invention at pressures below 40 kbars is that it permits the use of relatively simple apparatus possessing much larger working volumes than the apparatus used to achieve temperature and pressure conditions in or near the diamond stability field at pressures exceeding 45 kbars. In the latter case, it is necessary to use apparatus such as that described in the U.S. Pat. No. 2,941,248 (Hall) in which the pressure vessel and pistons are constructed of tungsten carbide and possess a complex geometry which severely restricts the size of the working volume. On the other hand, if the pressures necessary to produce good quality compacts are less than 40 kbars, the apparatus used can possess a very simple geometry such as a straight piston which compresses the pressure medium axially within a straight cylinder. Apparatus possessing this simple piston-cylinder geometry has been described by Bridgman ("The Physics of High Pressure" 1952 ed. G. Bell and Sons Ltd. London) and by Boyd and England (J. Geophys. Res. 65. 741, 1960). This kind of apparatus can readily be scaled up to yield a large working volume. Moreover, the pressure vessel can be constructed entirely of steel, which is much cheaper than tungsten carbide. Because of these factors, compacts having substantial compressive strengths can be produced below 40 kbars in piston-cylinder apparatus at costs which are as much as ten times smaller (per compact) than the costs of producing them in apparatus operating above 45 kbars as conventionally used in synthesis of diamonds. A principal advantage of the present invention is its capability of producing mechanically strong and hard compacts using a piston-cylinder high pressure apparatus.

An important advantage of forming the compact under pressure-temperature-time conditions wherein a majority of the diamond crystals undergo plastic deformation is that deformation permits diamond-to-diamond contacts in two dimensions, along faces, rather than at points and edges. In some cases, thin films of bonding agent may form between such closely adjacent crystals. This structure provides greater compressive strength and rigidity in the resultant compacts. A further advantage is that plastically deformed diamond is harder than undeformed diamond.

To produce a compact possessing optimum strength and hardness at the temperatures utilized in this invention, it is desirable that the bonding agent should achieve substantial or complete chemical equilibrium with diamond. Otherwise it is likely to weaken prematurely at elevated temperatures. Likewise, the minimum melting point of the diamond-bond composite should be higher than about 1600° C. in order to prevent premature softening of the bond when the compact is used for practical purposes such as drilling, which can generate high contact temperatures.

It is to be understood that the pressures nominated in this specification refer generally to the mean confining pressures developed in the pressure medium within the high pressure apparatus, which are in turn applied to the outer surface of the mass of diamond crystals plus intermixed bond material. In fact, the actual pressures on individual diamond crystals within the diamond mass may deviate considerably from the mean confining pressure as defined above. Where diamond crystals are in contact at points and edges, the local pressures at these contacts may be much higher than the mean confining pressure. These localised high pressures play an important role in causing the plastic deformation in diamonds within the mean confining pressure range. In other localised sites where diamond crystals are not in contact with each other, the local pressure at these sites may be lower than the mean confining pressure.

In the process of the present invention, the bonding agent is intimately mixed with the mass of diamond crystals prior to exposure to high pressure and high temperatures. The relative proportions in volume percent of the bonding agent (B) and the diamond crystals (D) vary between the compositions $D_{60}B_{40}$ to $D_{95}B_5$, and preferably between the compositions $D_{70}B_{30}$ to $D_{95}B_5$. More preferably, the proportions in volume percent vary between $D_{80}B_{20}$ and $D_{90}B_{10}$.

In order to prepare compacts possessing the best properties, we have found that the bonding agent and the diamond crystals should be uniformly dispersed throughout one another prior to treatment at high pressures and temperatures. Mixing can be conveniently performed in a commercially available vibratory ball mill such as a 'Spex Mill' as manufactured by Spex Industries, Metuchen, N.J., U.S.A. In order to ensure good mixing, the particle size of the bonding agent is preferably smaller than 50 microns and more preferably smaller than 10 microns.

On the other hand, the particle size of the bonding agent should preferably be not much smaller than 0.1 micron. Metallic powders with very fine particle sizes sometimes possess oxide films on their surfaces or experience other forms of contamination which may deleteriously affect the properties of the compact. Thus, excellent compacts of rhenium and diamond have been prepared using rhenium powder in the size range 1–5 microns as described hereinafter. However, when the particle size was reduced to less than 0.1 micron, and otherwise similar conditions were employed, the resultant compact was relatively soft and weak.

An alternative method of obtaining the intimate mixture of bonding agent and diamond crystals is to apply a substantially uniform coating of the bonding agent to the surfaces of the diamond crystals, for example, by vapour deposition or by other coating techniques. The proportion by volume of the coatings of bonding agent to the volume of the diamonds remains within the limits specified above for powder mixtures of diamond and bonding agent.

The particle size of the diamond powder is preferably in the range 1–1000 microns and more preferably in the range 5–200 microns. Still more preferably, the diamonds are a range of sizes, e.g. from 5 to 200 microns, with the size distribution chosen so as to optimize the efficiency of packing, thereby minimizing the volume of bonding material. Diamonds smaller than 1 micron can be used, but have been found to be more likely to experience graphitization. It is advantageous in the performance of this invention to ensure that the surfaces of the diamonds and the bonding material are clean and, in the latter case, free from oxidised surface films. This is readily achieved by separately heating the diamonds and bonding material in an atmosphere of hydrogen at temperatures of 600°–800° C. prior to fabrication.

Two main groups of bonding agents are employed:

(a) Elements, or metallic alloys containing elements which react with carbon to form stable carbides which possess very high melting points exceeding about 1600° C. and typically exceeding 2000° C., such as silicon, titanium, tungsten, molybdenum, niobium, tantalum, zirconium, hafnium, chromium, vanadium, scandium, and boron, including alloys of elements from this group except silicon with other non-carbide forming elements such as tungsten and rhenium.

(b) Metals or alloys which do not form stable carbides but which become strongly bonded to diamond surfaces when heated with diamonds in the solid state under high pressure and which inhibit the retrogressive transformation of diamond to graphite at the contact surfaces, the bond having a melting temperature above about 1600° C. (e.g. rhenium, iridium, osmium, rhodium, ruthenium and platinum and, including metallic alloys of these elements among themselves and with other elements). The present invention has identified rhenium and its alloys as providing an exceptionally effective bonding agent.

Because of their affinity for carbon, the elements of the group (a) react extensively or completely with the diamonds to form interstitial carbide phases at the interfaces which provide a strong bond between the diamond crystals. Moreover, any graphite formed by retrogressive transformation of diamond is largely or completely converted into stable carbide phases (e.g. SiC, TiC, WC) as fast as it is formed. Thus the amount of free graphite is minimised. This makes it possible to subject the compact to sufficiently high pressures and temperatures, and for a sufficiently long period, to allow a substantial degree of plastic deformation of the diamonds and the achievement of chemical equilibrium between diamond and bond without the formation of excessive free graphite, which would be deleterious to the strength of the compact.

Among elements of the group (a), successful compacts possessing high hardness and mechanical strength have been made using silicon, tungsten, titanium, molybdenum, vanadium and chromium powders as bonding agents. These elements react with excess carbon (diamond) under the specified conditions to form the carbides SiC, WC, TiC, MoC, VC and $Cr_3C_2$ which bond the diamonds. Tantalum, niobium, zirconium, hafnium, scandium and boron also react readily with carbon under the conditions specified in this invention to form refractory carbides, which possess high hardness and mechanical strength and are considered to produce successful compacts in accordance with the invention given satisfactory particle size ranges.

Although the metals of the group (b) do not react with diamond to form carbides, they inhibit the rate at which diamond transforms to graphite at their interfaces with diamond and accordingly permit the compacts to be subjected to sufficiently high pressures and temperatures and for sufficiently long periods, to allow the desired degree of plastic deformation of the diamonds and diamond-to-metal bonding, without the formation of excessive amounts of graphite. Rhenium is notable in this class in that it has been found to accept several atomic percent of carbon into solid solution in its crystal lattice under the preferred conditions according to which the invention is performed. This appears to enhance the strength of the bonding between rhenium and diamond and also the effectiveness of rhenium as an inhibitor of graphitization. It has been found in the practice of this invention that iridium, ruthenium, rhodium, platinum and probably osmium, also accept significant amounts of carbon into solid solution (as evidenced by displacements of their X-ray back diffraction lines) and seem to behave analogously to rhenium.

When the elements designated in groups (a) and (b) have reacted with diamond in accordance with the invention to form carbide or metallic bonds, the minimum melting points of the resultant bonds are very high, exceeding about 1600° C. and mostly exceeding 2000° C. Diamond compacts using these bonding materials are much more resistant to mechanical softening and retrogressive graphitization when exposed to high temperatures than the metal-bonded compacts described for example in GB No. 1,382,080.

The process of the present invention will now be described by way of example only with reference to specific Examples and to the accompanying drawings, in which.

Figure 1:
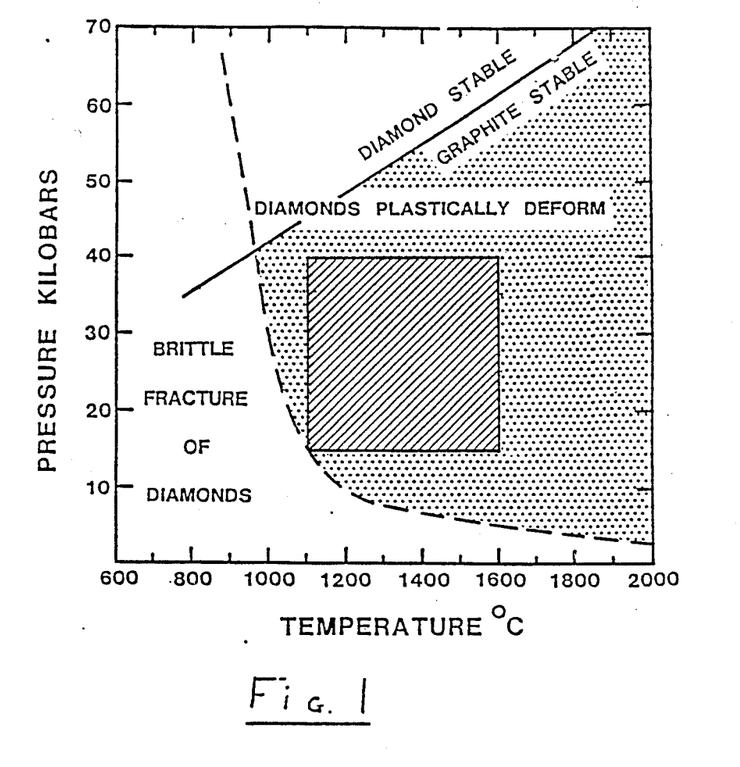
FIG. 1 is a temperature (T) - pressure (P) diagram showing the graphite-diamond equilibrium boundary (solid line) and the boundary (broken curve) between fields in which diamond has been observed to deform plastically and by brittle failure (R. De Vries: Mat. Res. Bull. 10,1193,1975). The pressures along the broken curve refer to the mean confining pressures in the pressure transmitting medium of high pressure apparatus, these pressures being applied to the surfaces of a mass of particulate diamond crystals The hatched region shows the range of P,T conditions under which the process of the present invention is preferably carried out.

In the performance of this invention, a mixture of diamond and bonding agent powders is placed in a suitable container and subjected to high pressures and temperatures in an apparatus designed for the purpose, e.g. a piston-cylinder high pressure apparatus. The pressure-temperature conditions which are utilized in this invention are greater than 10 kbars and preferably above 15 kbars and above 1100° C. to the right of the broken line which defines the mean P,T field where diamond deforms plastically as shown in FIG. 1. The temperatures are below 1600° C. and also below the minimum melting temperatures of the bonds. The maximum pressure is 40 kbars. Accordingly, the preferred pressure-temperature conditions utilized are within the hatched region of FIG. 1.

Reaction times used in the performance of this invention are determined by the necessary requirements to obtain a desired degree of plastic deformation of diamonds with consequent face-to-face contacts, a substantial or complete degree of chemical equilibrium between the diamonds and the bond, and minimum formation of free graphite. They vary according to temperature and the nature of the bonding agent. Reaction times utilized in this invention preferably range from 3 to 60 minutes with periods of 5 to 30 minutes being most commonly employed.

During compaction, the bonding agent either remains entirely in the solid state, or at least partially in the solid state. For example, when rhenium is used as binder, it remains crystalline throughout, but flows plastically (accommodating the compaction of the diamond) and accepts a significant amount of carbon into solid solution, so that the final bonding agent is a rhenium-carbon alloy. When tungsten is used, the reaction occurs entirely in the solid state as tungsten reacts with diamond to form tungsten carbide as the final binding agent. On the other hand, when silicon is used, it has been found that the temperature must exceed the melting point of silicon at the pressure used for the best properties to be achieved. The silicon reacts with diamond to form crystalline silicon carbide which provides the bond. The reaction is required to proceed until all or substantially all of the silicon has reacted with diamond to form silicon carbide, thereby providing a thermally stable bond which does not experience melting at temperatures below 2000° C.

Figure 2:
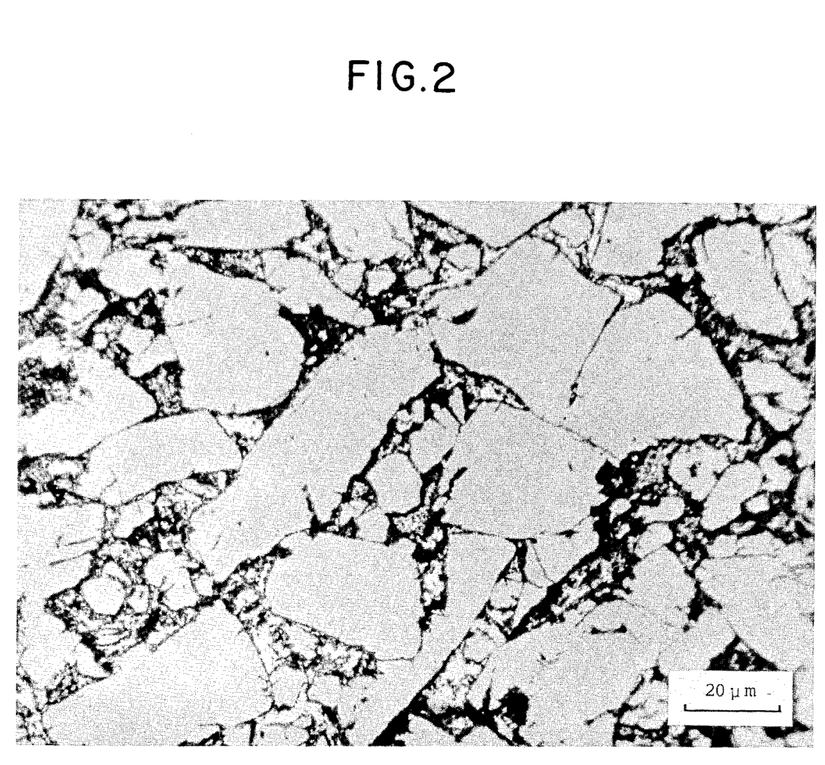
FIG. 2 is a photograph produced by optical microscopy of a polished section of a compact produced in accordance with Example 1. Diamond crystals shown as grey are bonded interstitially by silicon carbide which is white or mottled. The photograph shows that the diamonds have experienced substantial plastic deformation and exhibit numerous face-to-face contacts.
Figure 3:
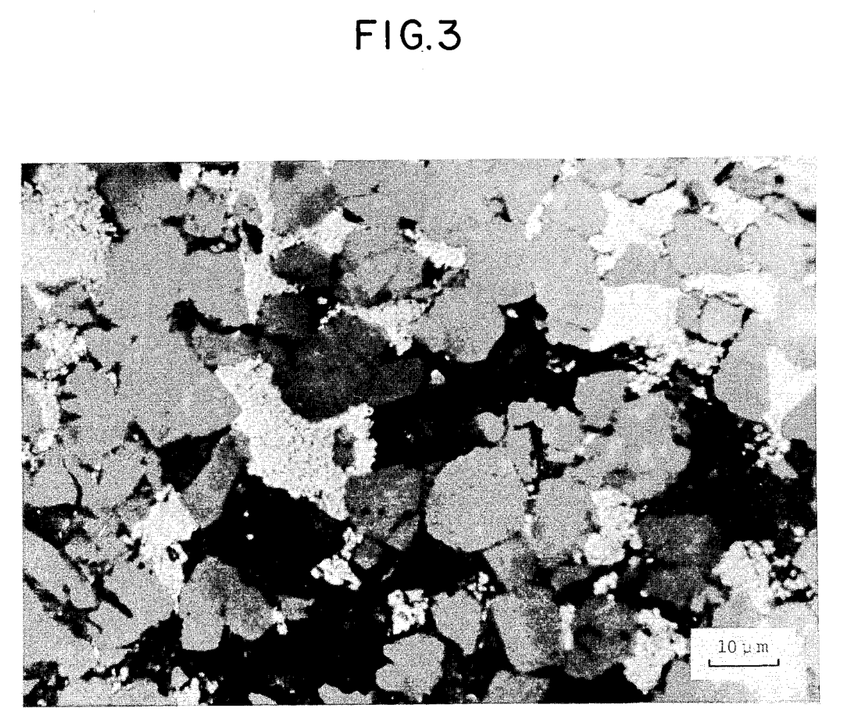
FIG. 3 is a photograph produced by optical microscopy of a polished section of a compact produced in accordance with Example 7. Diamond crystals are shown as medium grey and rhenium as light grey. The dark areas represent surface contamination from the grinding and polishing media. The diamonds display numerous face-to-face contacts caused by plastic deformation.

After the compact has been subjected to the desired reaction conditions, the pressure and temperature are lowered and the compact is removed from the apparatus. When the compact was formed according to any one of Examples 1 to 5 and 7 to 15 below, the compact was found to be a substantially fully dense, mechanically strong and extremely hard body with a compressive strength ranging between 10 and 60 kbars. Examination by optical and electron microscopy showed that the compact consists of a rigid framework of closely-packed diamonds displaying extensive plastic deformation and numerous face-to-face contacts between diamonds caused by plastic deformation. Evidence of plastic deformation is revealed by extensive 111 slip planes as shown by interference microscopy on polished surfaces. Occurrence of plastic deformation is also shown by enhanced optical anisotropy of diamond crystals in polarized light as compared to the diamond feedstock and by textural features displayed on polished sections, as shown in FIGS. 2 and 3. The actual degree of plastic deformation of the diamond crystals is not readily determinable. However, plastic deformation of a substantial proportion of the diamond crystals, and preferably at least a majority thereof, is considered an essential feature of the process of the invention in producing diamond compacts having a compressive strength exceeding 10 kbars.

The interstices of the diamond framework are filled by the bonding medium which provides the compact with much of its tensile strength In the cases where the bonding agent is a metallic carbide (including silicon and boron carbides), the tensile strength of the compact is provided mainly by bonding between the carbide phase and the diamond. If this is leached away by suitable solvents, the residual diamond framework is found to be quite weak and can be readily disintegrated, indicating a minimal degree of diamond-to-diamond bonding. When metals from group (b) above are used as bonding agents, a significant degree of solid solution of carbon in the metallic bond occurs, as evidenced by displacements of x-ray diffraction back reflection lines. It is believed that this active interaction between carbon and metal contributes to the strength of the bonding between the metal and the diamond, which provides most of the tensile strength of this class of compacts.

Pressure is an important variable in carrying out the present invention, irrespective of the nature of the bonding agent. Providing other variables such as temperature, time and bonding agent are kept constant, within the preferred sets of conditions defined previously, the mechanical strength of the compacts increases significantly as the mean confining pressure within the apparatus increases from 5 to 10 kbars. In the case where silicon is the bonding agent, the major improvement in strength by as much as fivefold, occurs as pressure is increased from 10 to 15 kbars, it is only after operating pressures exceed 10 kbars that compressive strengths exceeding about 20 kbars are obtained in the compact. Thus, as confining pressure increases from 15 through 20 to 30 kbars, there is sometimes a significant improvement in mechanical properties, but, there is little improvement in mechanical properties as pressure is increased from 30 to 40 kbars. In view of these factors, the optimum pressure used to produce compacts where silicon is used as bonding agent is between 15 and 30 kbars. When bonding agents other than silicon are used (e.g. rhenium or tungsten), the major improvement in strength occurs at higher pressures, sometimes between 15 and 20 kbars, and more often between 20 and 30 kbars. The optimum pressure used to produce compacts when bonding agents other than silicon are used is between 20 and 35 kbars.

Optical and electron-microscopy studies show that the rapid improvements in strength over the above pressure intervals are associated with an increasing degree of plastic deformation and increasing face-to-face contact between diamonds which occurs at confining pressures particularly between 10 and 20 kbars. Pressure is also found to decrease the degree of graphitization during compaction, providing other variables remain constant.

At a given pressure, e.g. 30 kbars, the optimum temperatures used in the practice of this invention vary according to the bonding agent and the time during which the compact is subjected to high pressure and temperature. Where the bonding agent is a metal from group (b) and reaction times are 5–30 minutes, the mechanical properties of compacts made at 1000° C. are generally poor. A major improvement occurs at about 1100° C. and optimum properties are usually achieved between 1200° and 1400° C., although excellent mechanical properties can also be produced between 1400° and 1600° C. As temperature is increased above 1400° C., plastic deformation occurs more readily, which is beneficial, but this may be countered by the formation of an increasing amount of graphite, which is harmful.

Where the bonding agent comprises an element from group (a) above, and reaction times are 5–30 minutes, reaction temperatures should be high enough to permit all or substantially all of the bonding agent to react with diamond to form the carbide bonding phase. For example, in the case of silicon, at pressures between 15 kbars and 30 kbars reaction rates are relatively slow at 1200° C. and below, and composites formed at these temperatures may possess poor mechanical strength. At 1300° C., silicon carbide is formed more readily to provide compacts possessing excellent mechanical properties but usually some unreacted silicon remains. Between 1400° and 1500° C., most or all of the silicon reacts to form silicon carbide and only a small amount (e.g. less than 2 percent) of graphite is formed. As temperature increases above 1500° C., an increasing amount of graphite is formed (dependent upon time). Nevertheless, compacts possessing good mechanical properties can be produced up to 1600° C. The behaviour of other carbide-forming bonding elements from group (a) is analogous to that of silicon except that the reaction is performed in the solid phase of the bonding agent. Although the temperatures required for production of compacts with optimum mechanical properties may vary significantly according to the nature of the bonding agent and whether it is from group (a) or group (b), the preferred temperature intervals for production of compacts possessing optimum mechanical properties is usually between 1200°–1500° C.

The times over which the compact is subjected to the preferred pressure and temperatures are chosen so as to produce extensive plastic deformation of diamonds with resultant face-to-face contacts and minimal formation of graphite as well as complete to substantially complete chemical reaction of group (a) bonding agents to form carbide bonding phases. A run-time of below two minutes is insufficient and poor quality samples are nearly always produced. Run times of two minutes occasionally produce good specimens but in most cases their quality is poor, whether the bonding agent is chosen from group (a) or group (b). When the run-time is extended to about 3 minutes, a moderate proportion of mechanically strong compacts is produced; and still further improvement is obtained in 5 minute runs. However, this period is not always sufficient to permit complete reaction of the bonding agent from group (a) elements above to form bonding carbide phases. Optimum run-times for the performance of this invention range from above 5 to 30 minutes. Run-times above 30 minutes can be employed but in most circumstances improvement in quality of the compact is relatively minor. When run-times exceed an hour at higher temperatures e.g. 1450°–1600° C., the formation of graphite may be accelerated. However, in some cases depending upon the combination of other process variables, particularly below 1500° C., run-times exceeding one hour can be employed without problems.

The mechanical properties of compacts can be improved in some cases by varying the sequences in which pressure and temperature are applied within the apparatus. Where optimum combinations of pressure, temperature and time are chosen, as described earlier, the simplest procedure is firstly to increase pressure on the diamond-bonding agent mixture to the chosen value, 30 kbars, then increase temperature to the desired value, e.g. 1300° C., hold for the required time, e.g. 20 minutes, and then to decrease temperature and then pressure slowly to ambient conditions. Subject to other variables this operating procedure usually produces compacts with good mechanical properties.

However, in some circumstances, compacts with improved properties can be obtained by first increasing temperature to a desired level of 1100° C. or higher, and then increasing pressure to the desired value. This causes a smaller degree of fracturing of diamond crystals as compared to the procedure of applying full pressure at the start. By applying pressure when the diamonds are already hot, the degree of plastic deformation can be maximized, with advantageous results. Moreover this procedure of applying temperature and then pressure has been found to decrease the amount of graphite produced by retrogressive transformation from diamond. From a reading of this specification, it will be clear to those skilled in the art, that numerous variations on the sequence of applying pressures and temperatures can be employed Sometimes, these are required in order to optimize the performance and operation of the high pressure apparatus and its pressure medium.

Diamond compacts produced according to the preferred conditions may display several desirable characteristics. Their hardness and abrasiveness may be higher than tungsten carbide, whilst their compressive strengths may be similar to or exceed that of tungsten carbide. Compressive strengths as high as 60 kbars have been measured. They are essentially isotropic in their macroscopic physical properties, unlike natural diamonds which are highly anisotropic. Further they may retain their strength and hardness to higher temperatures than previously proposed diamond compacts.

When mounted in an appropriate tool and operated in a drilling machine, the preferred compacts of the invention may readily penetrate samples of fully dense alumina, tungsten carbide, boron carbide and hard rocks such as granite and quartzite. Likewise, when operated on a lathe, the preferred compacts may readily turn samples of alumina, tungsten carbide, boron carbide and hard rocks such as granite and quartzite. These preferred compacts may be used for a variety of purposes such as drilling bits, cutting tools, wire-drawing dies and nozzles. Because the pressures required for the production of the preferred compacts having substantial compressive strengths are much lower than are required for the formation of previously proposed diamond compacts having satisfactory compressive strengths and formed in or near the diamond stability field, the apparatus required to produce them is simpler and can achieve much larger working volumes than is possible for apparatus operating in or near the diamond stability field. Accordingly, using the present invention, it is possible to produce larger and cheaper diamond compacts than can be produced by apparatus operating in or near the diamond stability field. This possesses many advantages which will be obvious to those skilled in the art. The following examples of production of diamond compacts according to the present invention are described.

EXAMPLE 1

Ninety weight percent of diamond crystals in the size range 10-80 microns were mixed with 10 weight percent of minus 10 micron silicon powder as bonding agent. The diamonds comprised 80 percent by weight in the size range 40-80 microns and 20 percent by weight in the size range 10-20 microns. Thorough inter-dispersion of diamonds and silicon was accomplished by vigorous agitation of the mixture in a Spex Mill for 20 minutes. The mixture was then tamped into a boron nitride capsule with an internal diameter of 6.2 mm and an internal height of 8 mm. The capsule was closed with a boron nitride disc. The capsule was then placed in a piston-cylinder high pressure-high temperature apparatus of the type described by F. Boyd and J. England (J. Geophys. Res. 65, 741, 1960). The internal diameter of the pressure vessel was 1.27 cm. The heater consisted of a tube of molybdenum and this was inserted in a sheath of boro-silicate glass which itself was surrounded by a talc pressure medium. Temperature was measured by a Pt-Pt$_{90}$Rh$_{10}$ thermocouple inserted within the pressure cell in close proximity to the sample.

A pressure of 2 kb was first applied to consolidate the components of the pressure cell. The temperature of the diamond-silicon mixture was then increased to 1200° C. over a period of 5 minutes. This temperature was insufficient to melt the silicon or to cause appreciable graphitization of the diamonds. Pressure within the apparatus was then increased to 30 kb over a period of 5 minutes. Temperature was then increased to 1450° C. over a period of 1 minute and held constant for 30 minutes. This caused the silicon to melt and react with diamonds to form a silicon carbide bond, accompanied by plastic deformation of the diamond crystals.

After completion of the run, temperature was reduced to 850° C. over two minutes whilst maintaining full pressure. At this temperature, the glass liner is still soft and provides a near-hydrostatic pressure environment around the heater and sample capsule. Pressure was then reduced to ambient conditions over a period of 1 hour after which temperature was reduced to ambient conditions over 2 minutes. The sample capsule was then removed from the apparatus.

The powder mixture was found to have formed into a diamond compact which was recovered in the form of an intact, uncracked cylinder with a diameter of 4.7 mm and a height of 5.8 mm. Its density was 3.34 g/cm$^3$ and its mass was 0.34 gms. The compact possessed good strength and hardness. When broken, the fractures were found to extend through the diamond crystals, showing the strength of the silicon carbide bond. X-ray diffraction analysis showed that the compact consisted of diamond and silicon carbide with less than 0.5 percent of graphite. Reaction of diamond with silicon to form silicon carbide was essentially complete since no residual silicon was detected by X-ray analysis. Examination of fragments and polished surfaces by electron microscopy and optical microscopy revealed evidence of widespread plastic flow of diamonds and extensive face-to-face contacts (FIG. 2). The diamonds were also found to be optically anisotropic in small domains, in contrast to the isotropic diamond feedstock, thereby providing further evidence of deformation. The sample consisted of about 86 volume percent of diamond and about 14 volume percent of silicon carbide.

When samples from the compact were mounted in suitable tools, and operated in a drilling machine, they were found to readily drill holes into samples of tungsten carbide, boron carbide and fully dense alumina. Likewise, suitably mounted samples operated in a lathe readily turned cylinders of tungsten carbide, alumina and boron carbide.

Additional tests were applied to intact diamond compacts produced by identical procedures to those described above. The compressive strength of a typical compact was found to be about 50 kilobars. The performances of intact compacts in turning cylinders of granite, quartzite and dense, sintered alumina were compared with the performances of ground Kennametal grade K68 tungsten carbide cylinders possessing identical sizes to the compacts. The top circular edges of the tungsten carbide and unground diamond compact cylinders were used as cutting tools and the performances of the diamond compacts were found to be greatly superior to those of the tungsten carbide cylinders. Cylinders of granite and quartzite 32 mm in diameter were rotated in a lathe at 600 rpm, and the tool was set to make cuts of 0.1 mm depth. When tungsten carbide tools were used to turn the cylinders, the rates of wear of the tools increased with the number of cuts and after a limited number of cuts (30 for granite cuts, 20 for quartzite), the tools became blunt and were unable to remove any further stock. In contrast, the rate of wear of the diamond compacts decreased initially with the number of cuts as better quality grinding stone beneath the original surface was exposed. The diamond compact tools then continued to remove stock from the granite and quartzite at a constant rate between 20 and 100 cuts with no sign of blunting. After 100 cuts, the rate of wear of the tool was so small as to be negligible and it was clear that the tool could continue to be used in this manner for a greatly increased number of cuts. The tungsten carbide tool was unable to remove stock from the alundum cylinder, which, however, was readily turned by the diamond compact, with a similar rate of stock removal to that displayed by the quartzite.

EXAMPLE 2

The pressure vessel used in this example possessed a diameter of 1.59 cm and the talc pressure medium was replaced by sodium chloride. The boron nitride capsule used to contain the diamond-silicon mixture possessed an internal diameter of 8.5 mm and an internal depth of 9 mm. Otherwise all procedures and materials used were the same as in Example 1.

The diamond compact was recovered as an intact unbroken cylinder with a diameter of 7.8 mm and a height of 7.0 mm. Its density was 3.29 g/cm$^3$ and it weighed 1.10 gm. The phase composition and properties of this compact were essentially identical to those of Example 1.

EXAMPLE 3

The method of preparation and the proportions in the mixture of diamond and silicon powder, and the pressure vessel and pressure cell were identical to those of Example 1. Pressure on the sample was raised to 3 kb and temperature was increased to 1200° C. over 5 minutes. Pressure was then increased to 30 kb over 5 minutes. Temperature was then increased to 1400° C. and maintained constant for 5 minutes. Temperature and pressure were then released as in Example 1.

The diamond compact was recovered as a fully dense, intact cylinder, displaying negligible porosity and possessing a density of 3.28 g/cm$^3$. Examination by X-ray diffraction showed that the sample possessed 1 to 2 percent of unreacted silicon and less than 1 percent of graphite. The sample possessed considerable mechanical strength and hardness. When mounted in appropriate tools, it readily drilled and turned samples of tungsten carbide, fully dense alundum and boron carbide. The example also demonstrates that a reaction time longer than 5 minutes may be desirable if all the silicon is to react to form silicon carbide.

EXAMPLE 4

This example was performed according to the conditions and procedures described in Example 1 except that a maximum pressure of 20 kb was maintained at 1450° C. for 30 minutes. The properties of the resultant compact were essentially identical with that produced in Example 1. This example demonstrates that a compact possessing high compressive strength and hardness can be produced at 20 kilobars.

EXAMPLE 5

This example was performed using the conditions and procedures of Example 1 except that a maximum pressure of 15 kb was maintained at 1450° C. for 30 minutes. The properties of the resultant compact were generally similar to those produced in Example 1.

EXAMPLE 6

This example was performed using the conditions and procedures of Example 1 except that a maximum pressure of 10 kb was maintained at 1450° C. for 30 minutes. The compressive strength of the resultant compact was considerably less than that of the compact of Example 5.

EXAMPLE 7

Forty weight percent of diamond crystals in the size-range 10-20 microns were intimately mixed with sixty weight percent of minus 10 micron rhenium powder using the same procedures as described in Example 1. The surfaces of the rhenium powder had previously been cleaned by exposure to a mixture of argon plus 4 percent hydrogen at 700° C. for 1 hour. The mixture of diamond and rhenium powders was tamped into a boron nitride capsule possessing an internal diameter 6 mm and an internal height of 7 mm. The capsule was then placed within a high pressure-high temperature apparatus as used in Example 1.

A pressure of 2.5 kb was first briefly applied, then the temperature of the capsule was increased to 850° C. Pressure was then raised to 30 kb over 5 minutes after which temperature was increased to 1200° C. and held for 4 minutes. Temperature was then increased to 1300° C. and held for 20 minutes. After completion of the run, pressure and temperature were relaxed as described in Example 1.

The sample was recovered as an intact cylinder 5.2 mm diameter by 4.7 mm long. X-ray diffraction analysis showed that the compact comprised diamond and rhenium and contained less than 0.5 percent of graphite. The X-ray inter-planar spacings of the rhenium had expanded significantly in comparison to those of the pure metal, implying the presence of a few atomic percent of carbon in solid solution. Examination of fragments and polished surfaces by electron microscopy and optical microscopy revealed evidence of widespread plastic flow of diamonds and extensive face-to-face contacts (FIG. 3). The sample contained about 20 volume percent of rhenium. Polished sections (FIG. 3) showed that the distribution of rhenium within the compact was rather irregular. It is difficult to obtain uniform mixing of powders possessing such different densities as rhenium and diamond by mechanical methods. The Example showed that if the rhenium had been distributed more uniformly, it would be possible to utilize a smaller proportion of rhenium and still obtain a mechanically strong and abrasive compact.

The rhenium-bonded compact of this Example displayed comparable mechanical strength and abrasive characteristics to the compact described in Example 1. When mounted in suitable tools, compacts made under the conditions described herein readily drilled and turned samples of tungsten carbide, alumina, boron carbide, granite and quartzite.

EXAMPLE 8

A mixture of diamond crystals was prepared comprising 75 weight percent in the size range 40-80 microns, 20 weight percent in the size range 10-20 microns and 5 weight percent with a size of approximately 5 microns. Forty weight percent of this mixture of diamonds was further mixed with sixty weight percent of minus 10 micron rhenium powder. The remaining procedures of this Example were performed as described for Example 7. The properties of the resultant compact in this Example were at least similar to those of the compact produced in Example 7.

EXAMPLE 9

Thirty five weight percent of diamond crystals in the size range 10-20 microns were mixed with 65 weight percent of minus 10 micron iridium powder in the manner described in Example 1. The experimental procedures were similar to those used in Example 1 except that the maximum run temperature was 1300° C. at 30 kilobars, these conditions being maintained for 40 minutes.

The resultant diamond-iridium compact contained less than 0.5% graphite. A small displacement of lattice spacings of the iridium indicated the presence of some carbon in solid solution in the iridium. Polished sections revealed that plastic deformation of diamonds had occurred and extensive face-to-face contact between crystals was developed.

The strength and abrasiveness of the diamond-iridium compact were similar to those described in the previous Examples.

EXAMPLE 10

Fifty three weight percent of diamond crystals in the size range 10-20 microns were mixed with 47 weight percent of minus 10 micron ruthenium powder which had been pre-reduced in argon-4% hydrogen at 700° C. The experimental procedures followed were identical with those of Example 9 except that maximum pressure and temperature were maintained only for 20 minutes.

The resultant diamond-ruthenium compact contained less than 0.3% of graphite and a small amount of carbon was present in solid solution in the ruthenium. The compressive strength and abrasive properties of the compact were somewhat less than those of the compact produced in Example 9. Nevertheless, the compact readily turns samples of tungsten carbide, alundum and boron carbide.

EXAMPLE 11

Forty four percent of diamond crystals as used in Example 1 were mixed with 56 percent of minus 10 micron tungsten powder in the manner described in Example 1. The experimental procedures were similar to those used in Example 1 except that the sample was maintained at a maximum temperature of 1400° C. for 20 minutes, the confining pressure being 30 kb.

The resultant compact contained less than half a percent of graphite. Most of the tungsten had reacted with diamond to form a tungsten carbide bond; however a few percent of unreacted metallic tungsten was present as inclusions within the tungsten carbide. The diamond crystals displayed extensive plastic deformation and face-to-face contacts.

The compact possessed a compressive strength and abrasiveness comparable to the compacts described in Examples 1 to 5 and 7 to 9. It displayed similar capacity to turn samples of tungsten carbide, boron carbide and alundum as shown by the compacts described in those examples.

Polished sections showed that the tungsten carbide was not uniformly distributed throughout the diamond matrix. It was evident that if a more homogeneous mixture of tungsten and diamond had been achieved prior to high pressure treatment, it should be possible to produce a compact possessing similar or greater mechanical strength and abrasiveness than was obtained in this Example, using a smaller proportion of tungsten.

EXAMPLE 12

Sixty four weight percent of diamond crystals as used in Example 1 were mixed with 36 weight percent of minus 10 micron molybdenum powder. Experimental procedures used were similar to those of Example 11. The resultant compact was composed of diamond bonded by molybdenum carbide. No residual metallic molybdenum was noted. The compact contained less than 0.5 percent of graphite. The hardness and abrasiveness of the resultant compact almost matched those of Example 11. However the compressive strength of the compact was somewhat smaller. Nevertheless, the compact possessed the capacity to turn samples of tungsten carbide, alundum and boron carbide.

EXAMPLE 13

Seventy three weight percent of diamonds in the size range specified in Example 1 were mixed with twenty seven weight percent of minus 25 micron titanium powder. The experimental procedures were identical to those used in Example 11.

The resultant compact contained less than 1 percent of graphite. All of the titanium had reacted with the diamond to form a bond of titanium carbide. The resultant compact was similar in many respects to that of Example 11. It was very hard and turned and drilled samples of tungsten carbide, boron carbide and alundum. However, its compressive strength was somewhat less than the compacts of Examples 11 and 12. It is believed that this was due to the presence of a titanium oxide impurity which was indicated by X-ray diffraction analysis.

EXAMPLE 14

Seventy one percent of diamonds in the size range specified in Example 1 were mixed with twenty nine weight percent of minus 5 micron chromium powder. The experimental procedures were similar to those used in Example 7.

The resultant compact contained less than two percent of graphite. All of the chromium had reacted to form a bond of chromium carbide $Cr_3C_2$. The resultant compact was similar in its hardness and strength to that described in Example 10.

EXAMPLE 15

Seventy percent of diamonds in the size range specified in Example 1 were mixed with thirty weight percent of minus 10 micron vanadium powder. The experimental procedures were similar to those used in Example 7 except that the sample was held at a maximum temperature of 1400° C. for 20 minutes under a pressure of 30 kb.

The resultant compact contained about 1 percent of graphite. All of the vanadium reacted to form a bond of vanadium carbide VC. The resultant compact was similar in hardness and strength to that described in Example 10.

In most of the Examples, diamond crystals were mechanically intimately mixed with bonding agents and the resultant compacts contained about 80-85 percent by volume of diamond and 15-20 percent by volume of bonding agents. Microscopic examination of polished sections of the resultant compacts showed that the distribution of bonding agents in many cases was non-uniform. Localised regions containing as little as 5 percent by volume of bonding agent nevertheless displayed high mechanical strength when indented, and clearly, were strongly bonded. These observations demonstrated that if improved methods of mixing had been employed, so as to obtain a more uniform distribution of bonding agent, it would be possible to produce compacts possessing good mechanical properties and containing as little as 5 volume percent of bonding agents. Techniques well known to the art which permit approximately uniform coatings of bonding agents to be applied directly to the surfaces of the individual diamond particles, prior to high pressure-temperature treatment are expected on the basis of the above observations, to produce good quality compacts containing as little as 5 volume percent of bonding agents. These techniques include vapour deposition, electro deposition and chemical reduction.

It is notable that the amounts of graphite formed in the compacts of the Examples were mostly less than 1 percent and often less than 0.5 percent as determined visually from x-ray diffraction photographs. However, when aggregates of the same diamond crystals without any intermixed bonding agent were subjected to the same experimental conditions, more than two percent of graphite was found in the product which was mechanically weak. This demonstrates the inhibiting effect of the bonding agents on the formation of graphite.

I claim:

1. A diamond compact comprised of 60 to 95 volume percent of diamond crystals which have been plastically deformed so that they form a rigid framework structure in which contacts between diamond crystals occur over surfaces, said surfaces arising from plastic deformation of the diamond crystals during formation of the compact under pressure and temperature conditions within the graphite stability field, said diamond framework structure being bonded substantially wholly by metallic phases comprised of metals not forming carbides in the presence of carbon,, said phases having a melting point greater than 1600° C., said compact comprising less than about 2% volume of graphite and possessing a compressive strength greater than 10 kbars.

* * * * *